(12) United States Patent
Brewer

(10) Patent No.: US 6,618,525 B1
(45) Date of Patent: Sep. 9, 2003

(54) MOTORIZED VACUUM TWIST FIXTURE

(75) Inventor: Tracy E. Brewer, Hayward, CA (US)

(73) Assignee: WaveSplitter Technologies, Inc., Fremont, CA (US)

( * ) Notice: Subject to any disclaimer, the term of this patent is extended or adjusted under 35 U.S.C. 154(b) by 0 days.

(21) Appl. No.: 09/935,418

(22) Filed: Aug. 22, 2001

(51) Int. Cl.[7] .............................. G02B 6/26; G02B 6/42
(52) U.S. Cl. .............................. 385/43; 385/39; 385/42
(58) Field of Search ................. 385/39, 43, 42

(56) References Cited

U.S. PATENT DOCUMENTS

| | | | | |
|---|---|---|---|---|
| 4,726,643 A | * | 2/1988 | Imoto et al. | 359/900 |
| 4,763,272 A | * | 8/1988 | McLandrich | 385/43 |
| 4,822,128 A | * | 4/1989 | Imoto et al. | 264/1.25 |
| 5,325,450 A | * | 6/1994 | Suganuma et al. | 359/127 |
| 5,448,673 A | * | 9/1995 | Murphy et al. | 385/123 |
| 5,491,764 A | * | 2/1996 | Hu et al. | 385/24 |
| 5,553,179 A | * | 9/1996 | Cryan et al. | 385/42 |
| 5,809,189 A | * | 9/1998 | Murphy et al. | 385/43 |
| 5,809,190 A | * | 9/1998 | Chen | 385/43 |
| 5,883,992 A | * | 3/1999 | Gonthier | 385/43 |
| 6,049,645 A | * | 4/2000 | Pan et al. | 385/39 |
| 6,148,129 A | * | 11/2000 | Pan et al. | 385/42 |
| 6,236,782 B1 | * | 5/2001 | Kewitsch et al. | 385/37 |
| 6,301,412 B1 | * | 10/2001 | Mori et al. | 385/46 |
| 6,363,190 B1 | * | 3/2002 | Chen | 385/42 |
| 6,385,372 B1 | * | 5/2002 | Yang | 188/322.14 |
| 2002/0122631 A1 | * | 9/2002 | Tomaru et al. | 385/43 |

FOREIGN PATENT DOCUMENTS

JP 63-115112 * 5/1988 ................. 385/43

* cited by examiner

Primary Examiner—Brian Healy
Assistant Examiner—Daniel Petkovsek
(74) Attorney, Agent, or Firm—Blakely, Sokoloff, Taylor & Zafman LLP

(57) ABSTRACT

A system and method for twisting together two fibers to create an optical fiber coupler is disclosed. In one embodiment, the two optic fibers are threaded through a chuck, which is rotated by a motor to create an amount of twist in the two optical fibers necessary to cause a light signal transmitted through the twisted fibers to have a desired polarization state. A heater applies heat to the twisted fibers while rotating the chuck to create an optical fiber coupler.

29 Claims, 8 Drawing Sheets

MOTORIZED VACUUM TWIST FIXTURE

FIELD OF THE INVENTION

The field of the invention relates to the creation of optical fiber couplers. More specifically, the invention relates to a motorized device for creating an optical fiber coupler with the amount of twist necessary to create a desired polarization state.

BACKGROUND OF THE INVENTION

Fiber optic couplers are used to combine a light signal from two separate fibers into a single fiber. Additionally, couplers can divide a light signal from a single fiber to separate signals for separate fibers. If the coupler is made properly, the coupler should have little loss and back reflection. The goal when making a coupler is to produce a coupler that can transmit a good waveform. An example of a good waveform is shown in FIG. 1a. The insertion loss, or the distance between the signal and the zero axis on the graph, is minimal and the separation between signals is distinct. An example of a bad waveform is shown in FIG. 1b. The insertion loss is great and the signals are jumbled together.

One of the common methods used for creating a fiber optic coupler is called fused biconical tapering. In fused biconical tapering, the fibers are twisted, heated, and pulled. During tapering, the signal transmitted through the coupler resembles the waveform shown in FIG. 1c. After tapering, the waveform resembles the bad waveform of FIG. 1b. The coupler is twisted until a waveform approximating the one of FIG. 1a is achieved.

A difficulty arises in twisting the fibers in such a way as to create the desired wave form. The coupler needs to be twisted to create a waveform with the proper insertion loss, isolation of signals, and wavelength period. Currently an optic fiber is twisted using a manual twisting, mechanism. Manual twisting reduces precision and increases the likelihood of error.

SUMMARY OF THE INVENTION

A system and method for twisting together two fibers to create an optical fiber coupler is disclosed. In one embodiment, the two optic fibers are threaded through a chuck, which is rotated by a motor to create an amount of twist in the two optical fibers necessary to cause a light signal transmitted through the twisted fibers to have a desired wave form. A heater applies heat to the twisted fibers while rotating the chuck to create and optical fiber coupler.

BRIEF DESCRIPTION OF THE DRAWINGS

The present invention is illustrated by way of example and not limitation in the figures of the accompanying drawings, in which.

DETAILED DESCRIPTION OF THE PREFERRED EMBODIMENT

An apparatus for creating a fiber optic coupler with desired waveforms and method for doing the same are disclosed. In the following detailed description, numerous specific details are set forth in order to provide a thorough understanding of the present invention. However, it will be apparent to one of ordinary skill in the art that these specific details need not be used to practice the present invention. In other circumstances, well-known structures, materials, circuits, processes and interfaces have not been shown or described in detail in order not to unnecessarily obscure the present invention.

In one embodiment, a system introduces an amount of twist in two optic fibers before the fibers are connected to form a coupler. This twist affects the waveform of the fibers. The twist is introduced by threading the fibers through a chuck and then rotating the chuck. The rotation of the chuck may be performed by a motor.

Figure 1A:
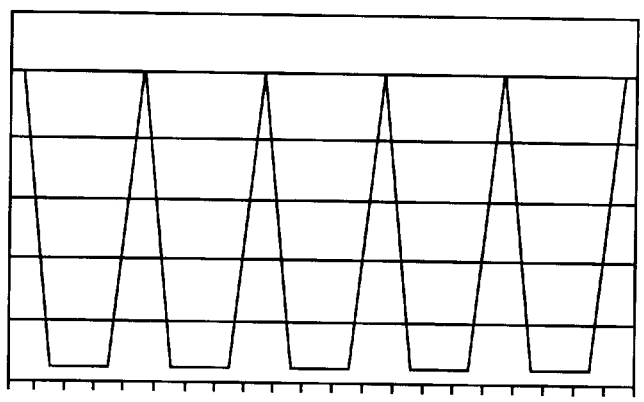
FIGS. 1a–c are waveform diagrams showing desired and undesired wave patterns for a coupler.
Figure 1B:
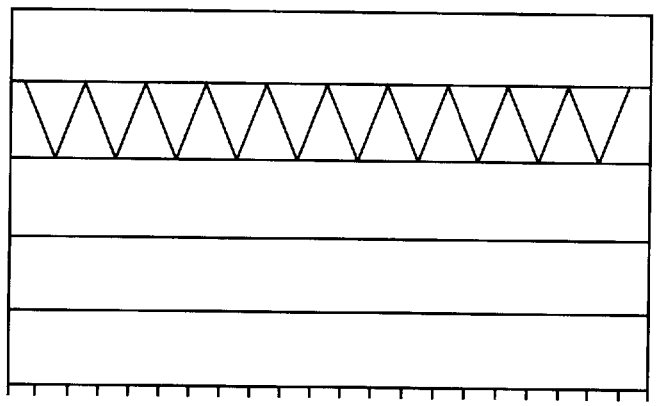
Figure 1C:
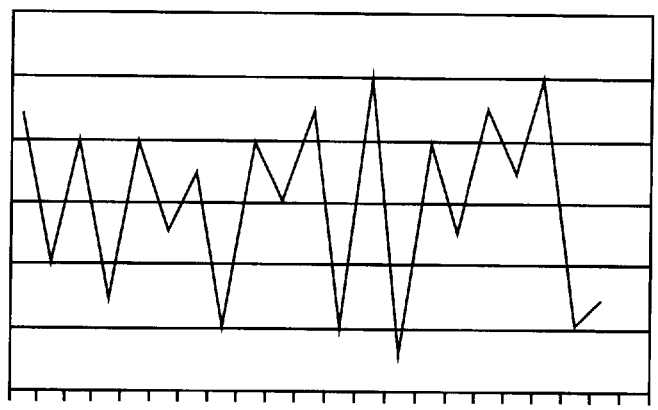
Figure 2:
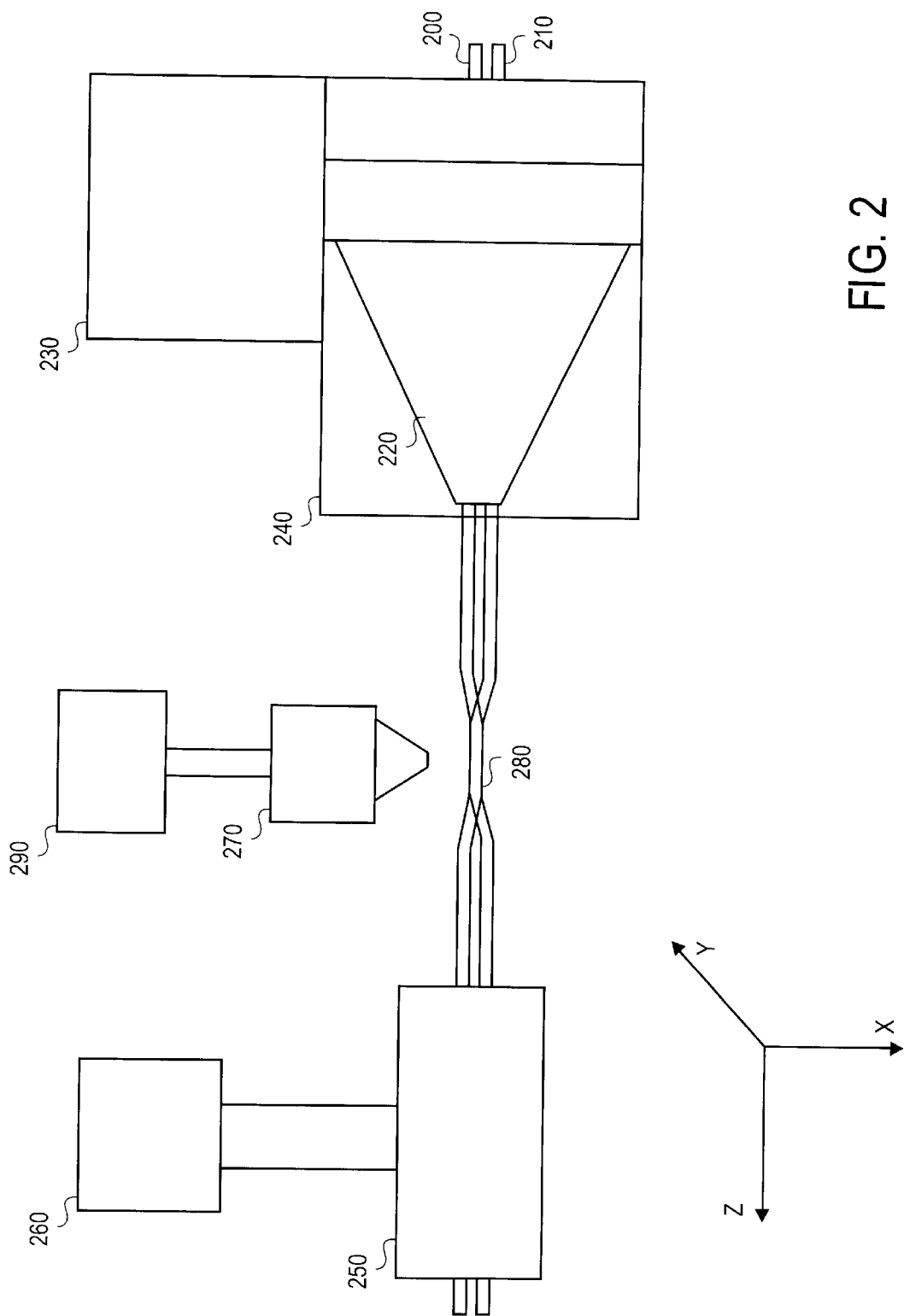
FIG. 2 illustrates one embodiment of coupler manufacturing system.

One embodiment of this system is illustrated in FIG. 2. A first optic fiber 200 and a second optic fiber 210 are threaded through a first chuck 220. In one embodiment, the chuck holds the fibers in place using a vacuum clamp, mechanical clamp, or some other kind of clamp. The first chuck 220 is coupled to a first motor 230, the chuck 220 and motor 230 held in place by a bracket 240. The first motor 230 rotates the first chuck 220 as needed by an operator. The first and second optic fibers are then threaded through a second chuck 250 coupled to a second motor 260. The second motor 260 moves the second chuck 250 laterally along the z-axis to pull the fibers during heating. A heat source 270 is positioned to apply to a twist 280 created in the two optic fibers. In one embodiment, a third motor 290 is coupled to the heat source 270 to allow the heat source to be moved according to the needs of the operator.

Figure 3:
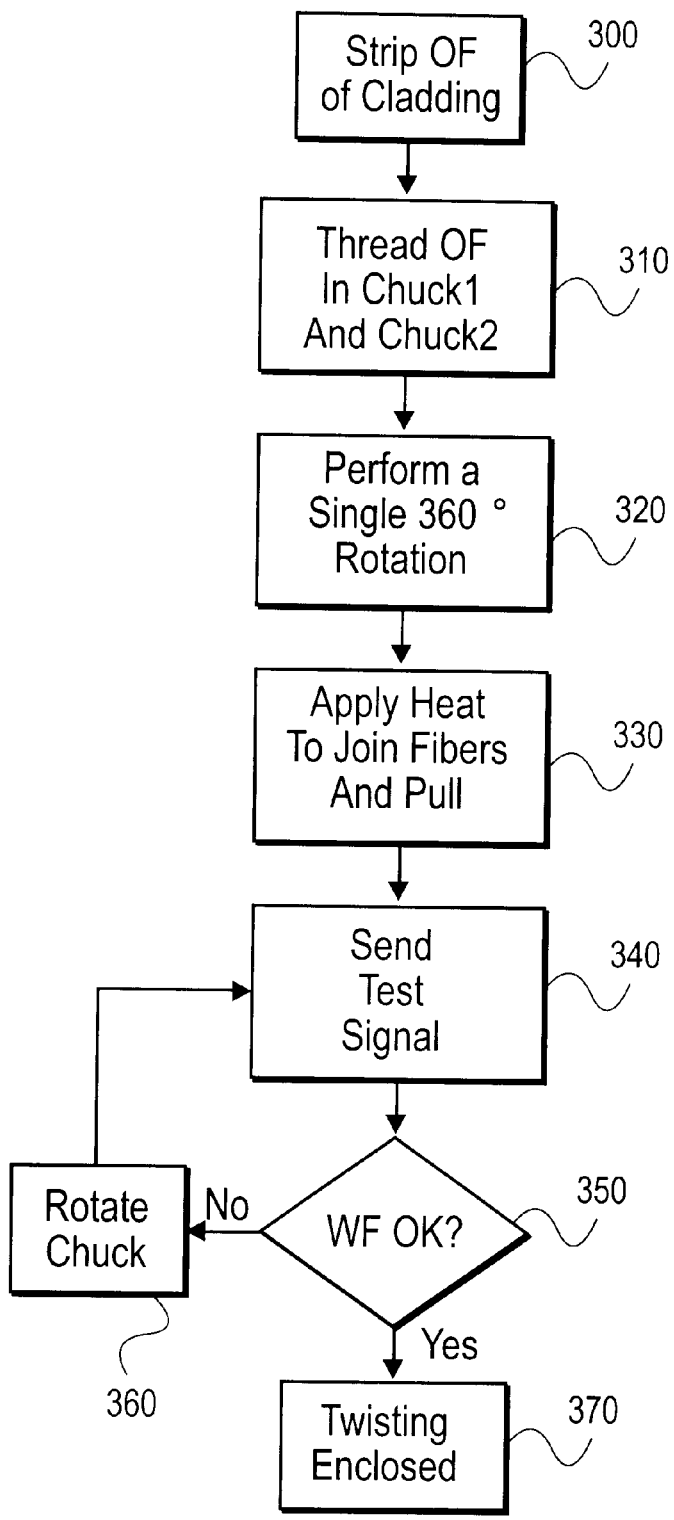
FIG. 3 is a flowchart illustrating one embodiment of a process for twisting optic fibers for a coupler.

One embodiment of a method using this system is illustrated in the flowchart of FIG. 3. The first optic fiber 200 and the second optic fiber 210 are stripped of their protective cladding to allow direct contact between the fibers 300. The two optic fibers are threaded through the first chuck (chuck1) and the second chuck (chuck2) 310. The first chuck 220 is rotated once 360 degrees while the second chuck 250 is kept stationary 320. This rotation produces a twist in the two fibers, bringing the two fibers in close contact with each other and aligning the fibers so that they are equidistant from the heat source 270.

A test signal transmitter, such as a broadband light source, is connected to one end of the first fiber 200 and a test signal receiver, such as an optical spectrum analyzer, is connected to the opposite end of the second fiber 210. The heat source 270 applies heat to the fibers at a perpendicular angle to the twist 280 as the second motor 260 moves the second chuck 250, pulling the optical fibers 330. As the fibers are being pulled and heated, the test signal transmitter sends a signal along the first optic fiber 340. The operator watches for the signal to appear on the test signal receiver. Once the signal appears on the test signal receiver, heat and tension continue to be applied to the fibers. The operator watches the amplitude of the waveform. Based on the desired wavelength of the signal, the operator watches the amplitude of the waveform expand and contract a certain number of times before stopping the heat and tension on the fiber.

If the waveform is not suitable for the operator's needs 350, the first chuck is rotated further to create more twist in the fibers 360. A test signal is sent continuously while the fiber is being twisted, and the waveform is monitored 340. In one embodiment, the first chuck is turned quickly to better display the changes in waveform. In a further embodiment, the first motor can be reversed to untwist the fibers if the operator wishes to go back to a previous waveform. Once the desired waveform is achieved, the twisting is enclosed 370. In one embodiment, the twisting is enclosed in a quartz sheath and glued, the sheath further protected by encasing the sheath in metal and other coverings.

Figure 4A:
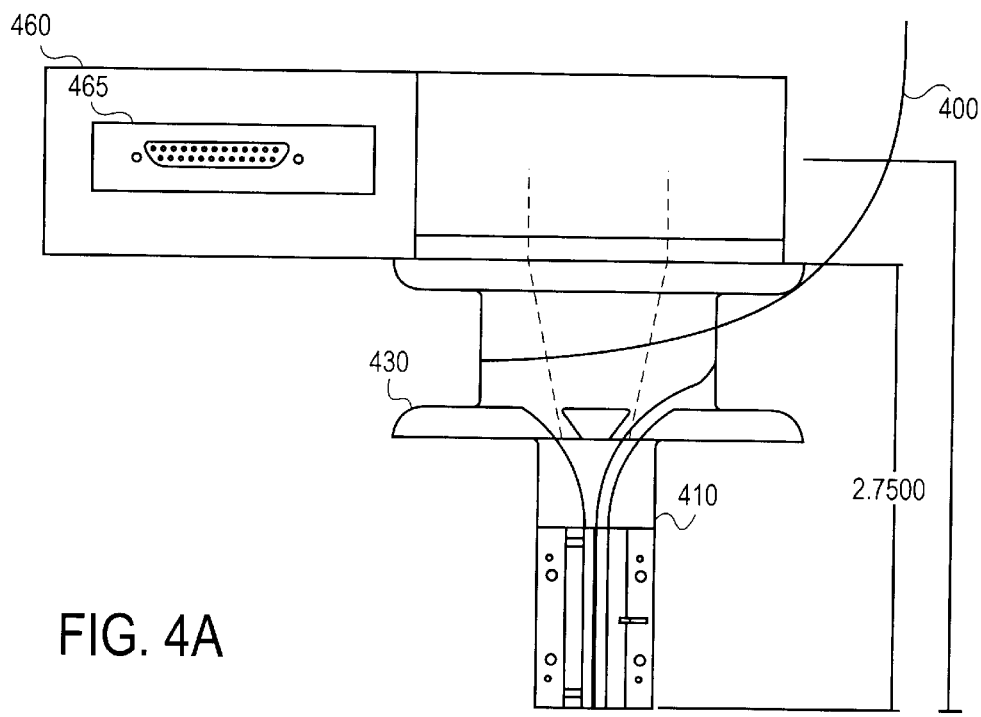
FIGS. 4A and 4B illustrate one embodiment of a fiber twist fixture with a mechanical clasp.
Figure 4B:
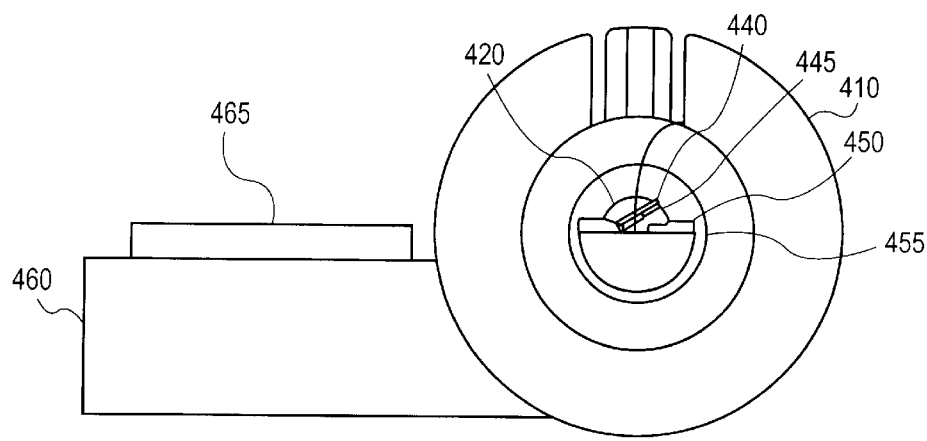

One embodiment of the chuck and motor, in which the optic fibers are held by a mechanical clasp, is illustrated in FIGS. 4A and 4B. Two optic fibers 400 are threaded through a chuck 410 via a thread hole 420. In one embodiment the fibers are wrapped around a spool 430 on the chuck 410. In one embodiment, multiple optic fibers 400 can be threaded in the chuck 410. The thread hole is expanded and the heat source and clasp device adapted to accommodate the multiple fibers. In one embodiment, the fiber 400 is secured within the thread hole 420 by a mechanical clamp mechanism. In one embodiment, the mechanical clamp is made of a swing clamp 440 covered by a protective pad 445. The pad 445 can be made of rubber or some other soft substance to protect the optic fiber. The swing clamp 440 is held in place by a swing clamp release 450. The fiber 400 is held in place by the swing clamp 440 and the alignment plate 455. A motor 460 then rotates the chuck 410, causing the first optic fiber 400 to twist together with the second optic fiber 430, while a heat source (e.g., torch) heats the fibers. In one embodiment, the motor has an input 465 that allows a user to control the speed and timing of the rotation of the chuck 410. In an alternate embodiment, an automated system, such as a computer running a control program, controls the rotation of the chuck 410 through the motor interface 465.

Figure 5:
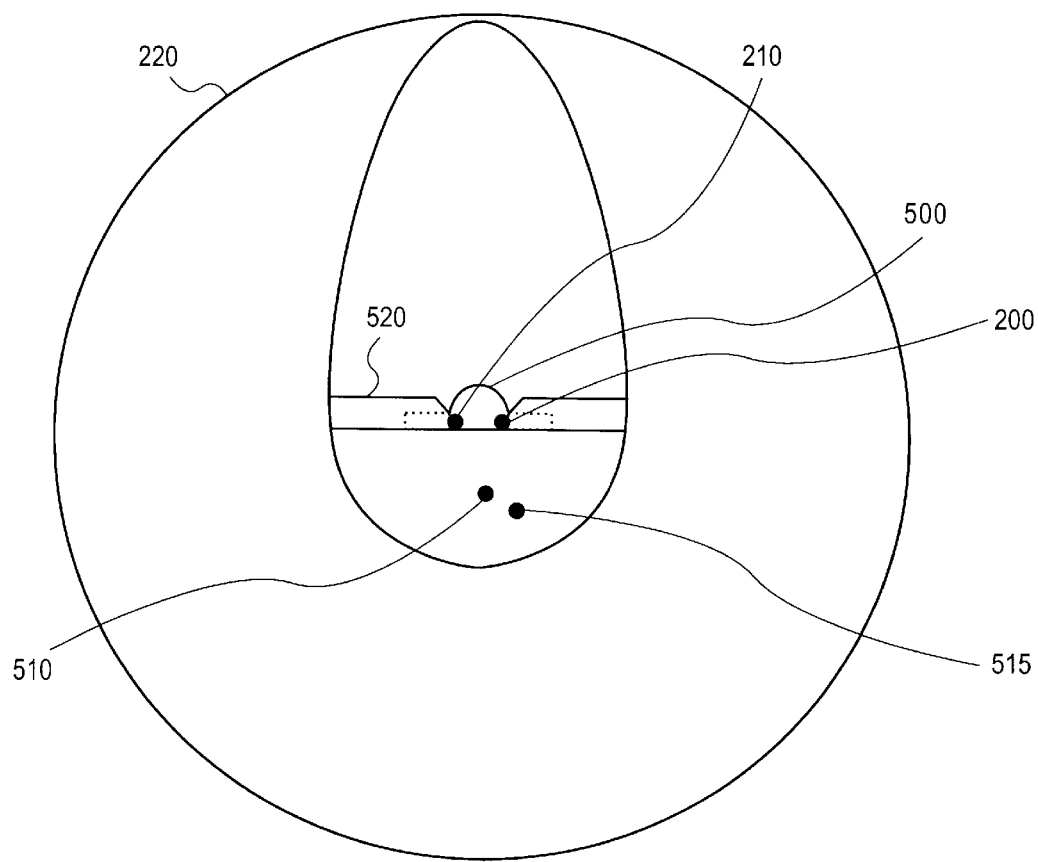
FIG. 5 illustrates a front view of a chuck using a vacuum environment to hold the fiber.

In an alternate embodiment, a vacuum clamp is used instead of a mechanical clamp to hold the fibers in place. A front view of a vacuum clamp chuck is illustrated in FIG. 5. The first optic fiber 200 and second optic fiber 210 are threaded through a thread hole 500 in the center of the chuck 220. The fibers are held in place by a first plenum 510 and a second plenum 515, each of which run off center through the chuck. The plenums are attached to vents 600 covered by two direction covers 520.

Figure 6:
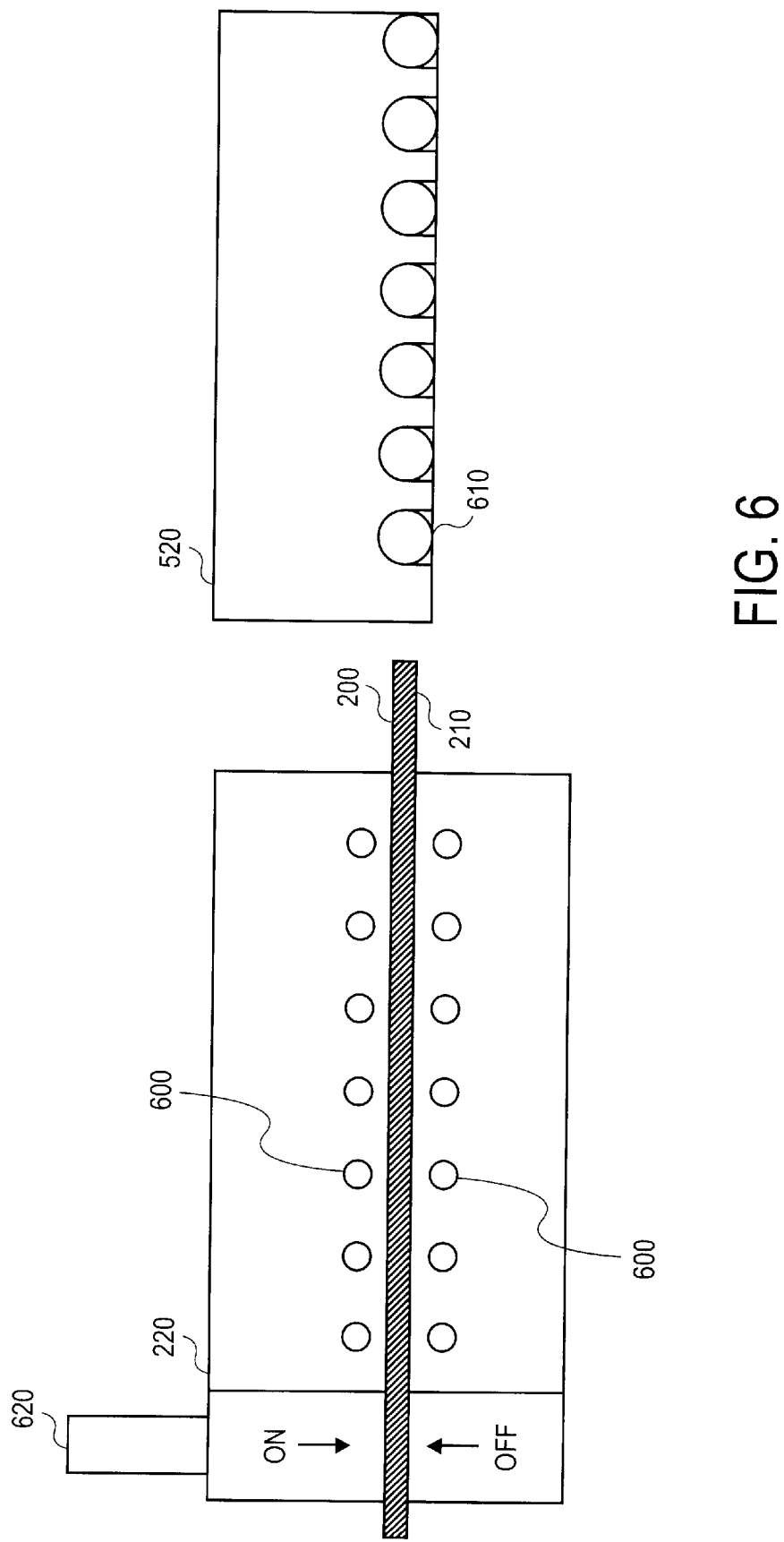
FIG. 6 illustrates a top view of a chuck using a vacuum environment to hold the fiber.

FIG. 6 illustrates a top view of the vents 600 without the cover 520. The directional covers 520 are grooved 610 to direct the vacuum created by the first plenum 510 and the second plenum 515 to be directed towards the center of the chuck 220. A switch 620 allows the second plenum 515 to be turned on and off. With the second plenum 515 turned off, the first optic fiber 200 is threaded along the center of the chuck. The fiber will move against the directional cover 520 of the plenum 510 that is still on, blocking off the vacuum produced by the plenum 510. With the second plenum 515 now turned on, the second fiber 210 is threaded along the center of the chuck 220. With the first plenum 510 blocked off, the fiber 210 will move towards the directional cover 520 of the second plenum 515. In alternate embodiment, both plenums can be turned on and off by the switch.

Figure 7:
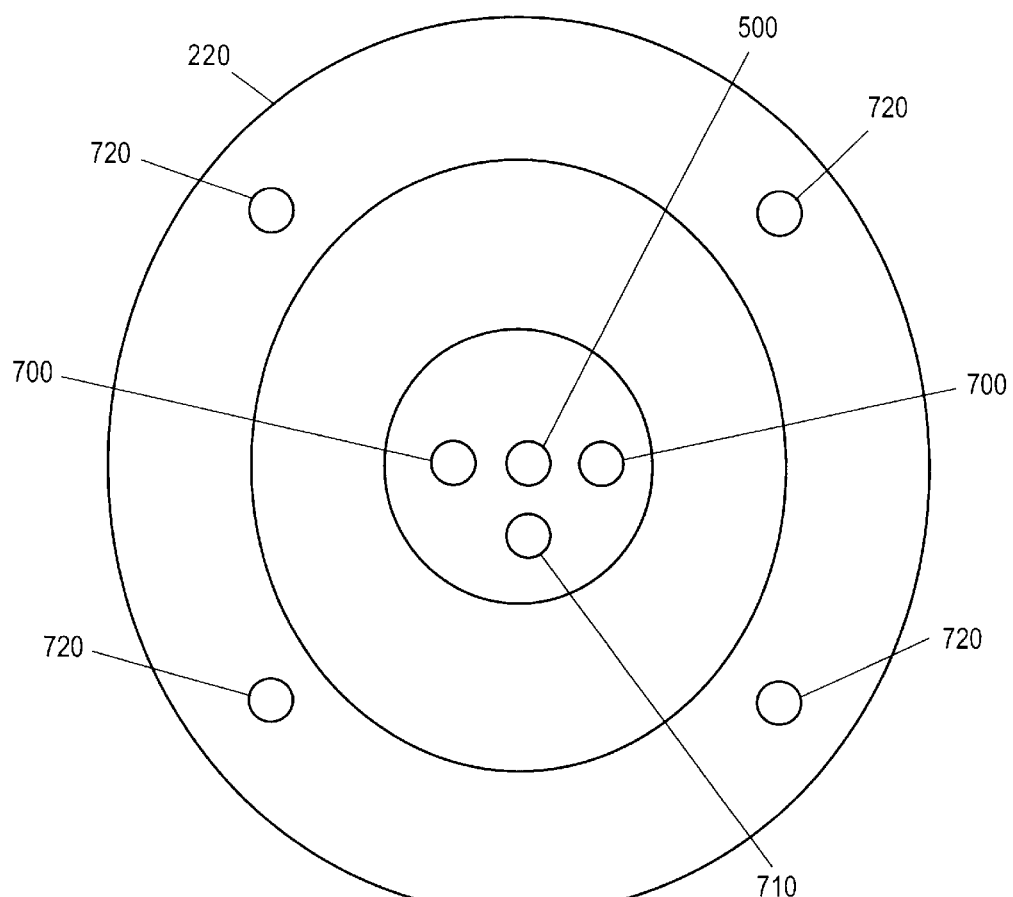
FIG. 7 illustrates a rear view of a chuck using a vacuum environment to hold the fiber.

FIG. 7 shows a rear view of the first chuck 220. The vacuum source is attached to the chuck 220 by the two holes 700 on either side of the thread hole 500. The vacuum source provides a vacuum environment, accessing the plenum through the hole 710 underneath the thread hole. The chuck 220 is attached to the motor 230 by four screws 720.

Figure 8A:
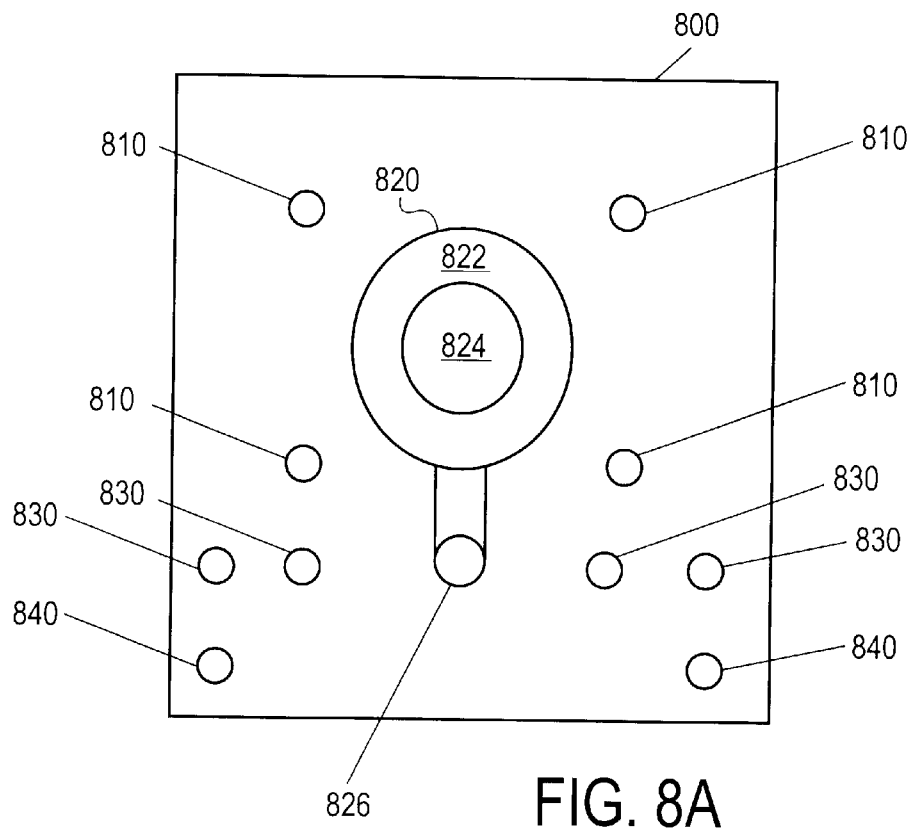
FIGS. 8a–b illustrates the back and bottom plate of a bracket used to hold the fiber twist fixture in place.
Figure 8B:
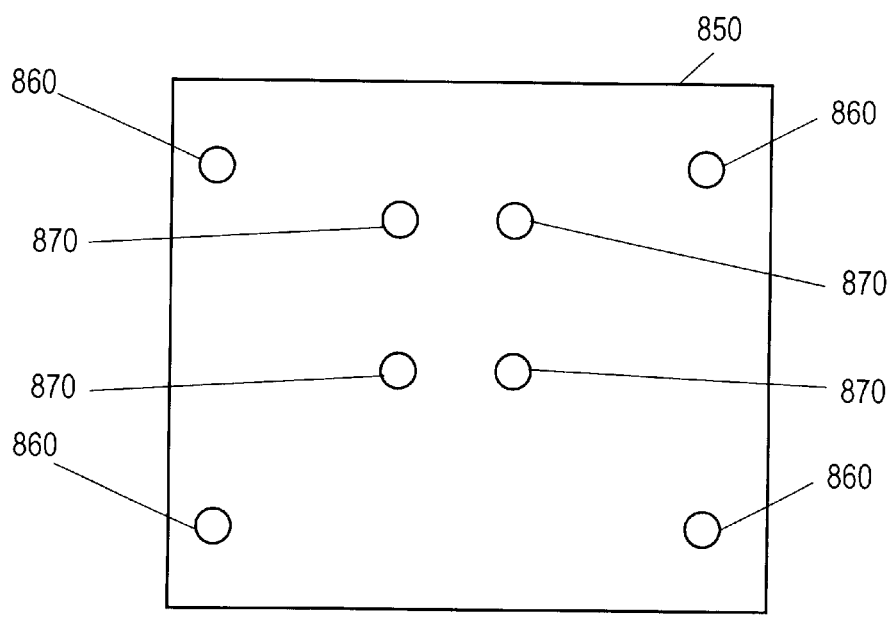

In one embodiment, the first chuck 220 and the first motor 230 are held in place by a bracket 240. One embodiment of the bracket is illustrated in FIGS. 8a and 8b. FIG. 8a illustrates the back 800 of the bracket. The motor is attached to the bracket by four screws 810 that control any movement in the y-direction by the motor 230 and chuck 220. The screws surround the vacuum distribution system 820, which comprises a socket 822 to connect to the vacuum source, a distributor 824 to distribute the vacuum so that the vacuum remains constant while the chuck is rotating, and a center 826 to direct the vacuum towards the chuck 220. A second set of screws 830 controls the pitch of the motor 230 and chuck 220. A third set of screws 840 attaches the back of the bracket 800 to the bottom of the bracket 850.

One embodiment of the bottom of the bracket 850 is illustrated in FIG. 8b. A first set of screws 860 controls the movement in the x-direction of the motor 230 and chuck 220. A second set of screws 870 controls the yaw.

Thus, a technique is described to introduce a specific twist in the connection of an optic fiber to a coupler, in order to achieve the desired polarization state. Although the present invention is described herein with reference to a specific preferred embodiment, many modifications and variations therein will readily occur to those with ordinary skill in the art. Accordingly, all such variations and modifications are included within the intended scope of the present invention as defined by the following claims.

What is claimed is:

1. An apparatus, comprising:
   a first chuck to hold a first optical fiber and a second optical fiber; and
   a first motor coupled to rotate the first chuck in relation to the holder to create an amount of twist in the first and second optical fiber necessary to cause a light signal transmitted through the twisted fibers to have a desired waveform,
   wherein the first and second optical fibers are wrapped around a spool disposed on the first chuck.

2. The apparatus of claim 1, wherein the first chuck holds and twists three or more fibers simultaneously.

3. The apparatus of claim 1, wherein the first chuck holds the first and second optical fibers in place with a mechanical clamp having an alignment plate and a fiber swing clamp held by a swing clamp release.

4. The apparatus of claim 3, wherein the first and second optical fibers are held in place by the swing clamp and the alignment plate.

5. The apparatus of claim 3, wherein the mechanical clamp further comprises a protective clamping pad coupled to the alignment plate to protect the first and second optical fibers.

6. The apparatus of claim 1, wherein the first chuck holds the first and second optical fiber in place using a vacuum environment having a first plenum and a second plenum, each of which running off a center through the chuck.

7. The apparatus of claim 6, wherein the vacuum environment in the first chuck is created by a vacuum source connected to the first and second plenums in the first chuck.

8. The apparatus of claim 7, wherein the first and second optical fibers are held by the first and second plenums respectively.

9. The apparatus of claim 7, wherein the vacuum source is able to selectively create a vacuum environment in each of the plenum.

10. The apparatus of claim 6, wherein the first and second plenums are attached to one or more vents covered by a first directional cover and a second directional cover respectively.

11. The apparatus of claim 10, wherein the first and second directional covers respectively direct the vacuum created by the first and second plenums towards to a center of the first chuck.

12. The apparatus of claim 11, wherein the one or more vents are formed in one or more grooves to allow the vacuum to be directed towards to the center of the first chuck.

13. The apparatus of claim 1, further comprising a second chuck to hold the fibers in position to be twisted.

14. The apparatus of claim 13, further comprising a second motor to move the second chuck away from the first chuck while the first and second optical fibers are being twisted.

15. The apparatus of claim 13, further comprising:
   a bracket coupled to the first chuck and first motor, the bracket holding the chuck in position relative to a second chuck; and
   screws to couple the first chuck to the bracket, the screws adjustable to control the position of the first chuck relative to the second chuck.

16. The apparatus of claim 15, wherein a heater is coupled to the bracket.

17. The apparatus of claim 1, wherein a heater is positioned relative to the first chuck so that the twisted fibers are heated perpendicularly.

18. A method, comprising:
   threading a first optic fiber and a second optic fiber into a first chuck;
   sending a light signal to test polarization states present in the first and second optic fiber; and
   using a first motor to rotate the first chuck to twist the first and second fiber to achieve a desired wave form,
   wherein the first and second optic fibers are wrapped around a spool disposed in the first chuck.

19. The method of claim 18, further including threading multiple optic fibers into the first chuck at once.

20. The method of claim 18, further including holding the first and second optic fiber in the first chuck by placing the first and second optic fiber in a mechanical clamp having an alignment plate and a fiber swing clamp held by a swing clamp release.

21. The method of claim 18, further including holding the first and second optic fiber in the first chuck with a vacuum environment having a first plenum and a second plenum attached to one or more vents covered by a first directional cover and a second directional cover to respectively direct the vacuum towards to a center of the first chuck.

22. The method of claim 21, further including creating the vacuum environment by attaching a vacuum source to the first and second plenums within the first chuck.

23. The method of claim 18, further including:
   using a bracket to hold the first chuck and first motor in position; and
   using a set of screws to couple the bracket to the chuck.

24. The method of claim 18, further including removing a layer of protective cladding from the first optic fiber and the second optic fiber.

25. The method of claim 18, further including applying a heat source to the first and second optic fiber.

26. The method of claim 25, wherein the heat source is applied perpendicular to the twisted fibers.

27. The method of claim 18, further including holding the first and second optic fiber in a second chuck.

28. The method of claim 27, further including using a second motor to pull the second chuck along a draw axis from the first chuck.

29. A system, comprising:
   a first chuck to hold a first optical fiber and a second optical fiber, wherein the first and second optical fibers are wrapped around a spool disposed in the first chuck; and
   a first motor coupled to rotate the first chuck to create an amount of twist in the first and second optical fiber necessary to cause a light signal transmitted through the twisted fibers to have a desired wave form;
   a bracket to hold the first chuck in position;
   a second chuck to hold the first optical fiber and second optical fiber stationary;
   a second motor to pull the second chuck along a draw axis from the first chuck;
   a heater to apply heat to the first and second optical fibers while rotating the first chuck to create an optical fiber coupler;
   a light signal transmitter to send a light signal across the twisted first optic fiber and second optic fiber; and
   a receiver to register the polarization state of the twisted first optic fiber and second optic fiber.

* * * * *